(12) United States Patent
Xu et al.

(10) Patent No.: US 10,132,985 B2
(45) Date of Patent: Nov. 20, 2018

(54) REFLECTION STRUCTURE, BACKLIGHT MODULE AND DISPLAY DEVICE

(71) Applicant: BOE Technology Group Co., Ltd., Beijing (CN)

(72) Inventors: Jian Xu, Beijing (CN); Yongda Ma, Beijing (CN); Xinyin Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/907,773

(22) PCT Filed: Jun. 15, 2015

(86) PCT No.: PCT/CN2015/081414
§ 371 (c)(1),
(2) Date: Jan. 26, 2016

(87) PCT Pub. No.: WO2016/107092
PCT Pub. Date: Jul. 7, 2016

(65) Prior Publication Data
US 2016/0327727 A1    Nov. 10, 2016

(30) Foreign Application Priority Data
Jan. 4, 2015   (CN) .................... 2015 2 0005453 U

(51) Int. Cl.
*F21V 7/04*      (2006.01)
*F21V 8/00*      (2006.01)
*F21V 7/18*      (2006.01)

(52) U.S. Cl.
CPC ......... *G02B 6/0055* (2013.01); *G02B 6/0031* (2013.01); *G02B 6/0088* (2013.01); *F21V 7/18* (2013.01)

(58) Field of Classification Search
CPC .. G02B 6/0055; G02B 6/0031; G02B 6/0088; F21V 7/05; F21V 7/16; F21V 7/18
See application file for complete search history.

(56) References Cited

U.S. PATENT DOCUMENTS

| 2004/0001345 A1* | 1/2004 | Lee et al. ............. G02B 6/0031 362/606 |
| 2005/0099790 A1* | 5/2005 | Kang .................... G02B 6/0055 362/632 |

(Continued)

FOREIGN PATENT DOCUMENTS

| CN | 102661527 A | 9/2012 |
| CN | 102853343 A | 1/2013 |

(Continued)

OTHER PUBLICATIONS

Oct. 13, 2015—(WO)—International Search Report and Written Opinion Appn PCT/CN2015/081414 with English Tran.

*Primary Examiner* — Y M. Lee
(74) *Attorney, Agent, or Firm* — Banner & Witcoff, Ltd.

(57) ABSTRACT

A reflection structure, a backlight module and a display device, the backlight module comprises a light source and a back plate and the light source is disposed on a side edge of the back plate, the reflection structure comprises: a first reflection plate disposed on the back plate, an end close to the light source of which can extend freely; and at least one second reflection plate disposed on an edge of the first reflection plate, wherein a first end of the second reflection plate overlaps the first reflection plate, a second end of the second reflection plate extends toward the side edge of the back plate, and at least one of the first end and the second end of the second reflection plate can extend freely.

13 Claims, 2 Drawing Sheets

(56) References Cited

U.S. PATENT DOCUMENTS

| | | | | |
|---|---|---|---|---|
| 2007/0147074 A1* | 6/2007 | Sakai et al. | ......... | G02B 6/0015 362/608 |
| 2007/0230217 A1* | 10/2007 | Sakaki | ................ | G02B 6/0031 362/624 |
| 2010/0165244 A1* | 7/2010 | Shin | ................. | G02F 1/133308 349/62 |
| 2010/0172153 A1* | 7/2010 | Ijzerman et al. | .... | G02B 6/0036 362/612 |
| 2011/0116015 A1* | 5/2011 | Yakura | ................ | G02B 6/0091 362/606 |
| 2012/0287355 A1* | 11/2012 | Oya | .................... | G02B 6/0031 362/609 |
| 2015/0124196 A1* | 5/2015 | Ono | .................... | G02B 6/0091 362/611 |

FOREIGN PATENT DOCUMENTS

| | | |
|---|---|---|
| CN | 102889564 A | 1/2013 |
| CN | 103115284 A | 5/2013 |
| CN | 103234160 A | 8/2013 |
| CN | 103309084 A | 9/2013 |
| CN | 103309085 A | 9/2013 |
| CN | 103453342 A | 12/2013 |
| CN | 103867961 A | 6/2014 |

* cited by examiner

REFLECTION STRUCTURE, BACKLIGHT MODULE AND DISPLAY DEVICE

The application is a U.S. National Phase Entry of International Application No. PCT PCT/CN2015/081414 filed on Jun. 15, 2015, designating the United States of America and claiming priority to Chinese Patent Application No. 201520005453.3 filed on Jan. 4, 2015. The present application claims priority to and the benefit of the above-identified applications and the above-identified applications are incorporated by reference herein in their entirety.

TECHNICAL FIELD

Embodiments of the present disclosure relate to a reflection structure, a backlight module and a display device.

BACKGROUND

A backlight module is one of the key components of a liquid crystal display device. Because liquid crystals do not emit any light by themselves, the main function of a backlight module is providing a uniform high brightness light emitter for a liquid crystal panel. The basic principle is converting a common point light emitter or a linear light emitter to a uniform high brightness surface light emitter through an effective optical structure, so that the display panel can normally display images. The backlight modules are not only applied in liquid crystal televisions and liquid crystal devices, but also can be applied in display devices requiring backlights such as digital photo frames, electronic papers, mobile phones and the like.

SUMMARY

Embodiments of the present disclosure provide a reflection structure, a backlight module and a display device which can solve the problem that is the deformation of the end close to the light source of the reflection plate caused by heat, and further the display effect is improved.

At least one embodiment of the present disclosure provides a reflection structure for a backlight module. In the case that the backlight module comprises a light source and a back plate and the light source is disposed on a side edge of the back plate, the reflection structure comprises: a first reflection plate disposed on the back plate, an end close to the light source of which can extend freely; at least one second reflection plate disposed on an edge of the first reflection plate; a first end of the second reflection plate overlaps the first reflection plate, and a second end of the second reflection plate extends toward the side edge of the back plate; at least one of the first end and the second end of the second reflection plate can extend freely.

At least one embodiment of the present disclosure also provides a backlight module comprising any one of the reflection structures mentioned above.

At least one embodiment of the present disclosure also provides a display device comprising any one of the backlight modules mentioned above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

1: back plate; 101: concave structure of back plate; 2: first reflection plate; 3: light source; 4: second reflection plate; 401: first end of second reflection plate; 402: second end of second reflection plate; 403: upward extending part; 404: extending part along light-exit surface; 405: bent part; 406: retractable extendable structure; 407: hollow pattern structure; 5: lug of back plate; 6: positioning column; 7: light guide plate; 701: bottom surface of light guide plate; 702: light-exit surface of light guide plate; 8: gap; 10: reflection plate.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
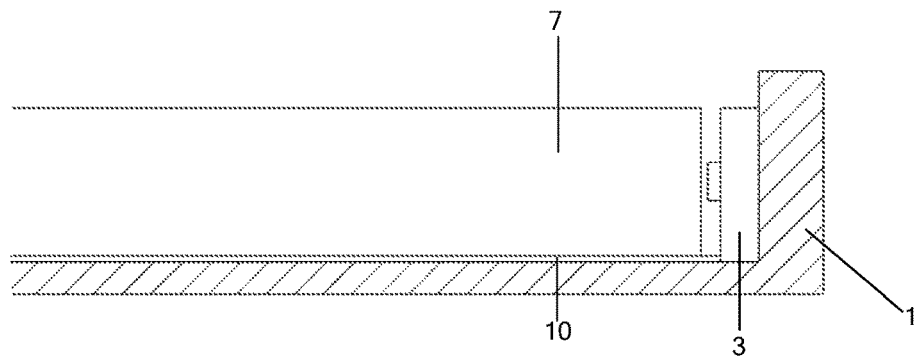
FIG. 1 is a cross section structure schematic view of a backlight module.

FIG. 1 is a cross section structure schematic view of a backlight module. As shown in FIG. 1, a reflection plate 10 is disposed on a back plate 1, and a light guide plate 7 is disposed on the reflection plate 10; a light source 3 is disposed between the side wall of the light guide plate 7 and the side edge of the back plate 1. The light emitted by the light source 3 enters the light guide plate 7 and then travels through optical plates such as the reflection plate 10, a diffuser plate and the like (other optical plates are not shown in the figure), and then the light converts to the uniform high brightness backlight to enter the liquid crystal panel.

In the research, the inventors of the present disclosure notice that when the backlight module is in operation, because of the high temperature of the light source 3, the temperature of the end close to the light source 3 of the reflection plate 10 is becoming high after a long operation period, and the hot area will spread to surroundings areas, which causes the wrinkle of the reflection plate and results in the non-uniform reflection light.

A reflection structure, a backlight module and a display device according to embodiments of the present disclosure can solve the problem of deformation of the end close to the light source of the reflection plate of a backlight module caused by heat, and further improve the display effect. In order to facilitate understanding, in the present disclosure the reflection structure is described in the context that the reflection structure is disposed in the backlight module.

Figure 2:
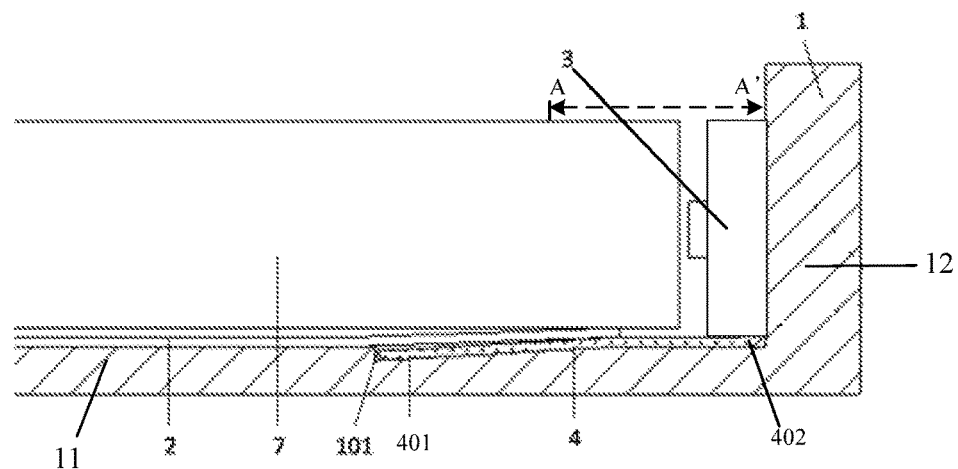
FIG. 2 is a first cross section structure schematic view of a backlight module according to an embodiment of the present disclosure.

At least one embodiment of the present disclosure provides a new reflection structure and a backlight module provided with the same. As shown in FIG. 2, the backlight module comprises a light source 3, a back plate 1 and a reflection structure according to at least one embodiment of the present disclosure, and the light source 3 is disposed on a side edge of the back plate 1. The reflection structure mentioned above comprises a first reflection plate 2 disposed on the back plate 1 and at least one second reflection plate 4, and the end close to the light source 3 of the first reflection plate 2 can extend freely; the at least one second reflection plate 4 is disposed on an edge of the first reflection plate 2. The first end 401 of the second reflection plate 4 overlaps the first reflection plate 2, and the second end 402 of the second reflection plate 4 extends toward the side edge of the back plate 1. At least one of the first end 401 and the second end 402 of the second reflection plate 4 can extend freely.

For example, the backlight module further comprises a light guide plate 7 which is disposed on the reflection structure. In this case, the light source 3 is disposed between the side wall of the light guide plate 7 and the side edge of the back plate 1, and the first reflection plate 2 is disposed directly under the light guide plate 7.

It should be noted that the shape of the back plate 1 is not limited by the embodiments of the present disclosure. For example, as shown in FIG. 2, the back plate 1 can only comprises a bottom plate 11, or the back plate 1 can comprise a bottom plate 11 and a side wall 12 (for example, the bottom plate 11 and the side wall 12 can be integrally formed). The side edge of the back plate 1 mentioned above and the upward side of the back plate 1 can be the side edge of the bottom plate 11 mentioned above and the upward side of the bottom plate 11 respectively. And in the following, embodiments of the present disclosure are illustrated with the example in which the back plate 1 comprises the bottom plate 11 and the side wall 12.

The reflection structure according to an embodiment of the present disclosure comprises a first reflection plate 2 and at least one second reflection plate 4. The first reflection plate 2 is the main reflection plate which is disposed directly under the light guide plate 7 disposed inside the back plate 1, and the end close to the light source 3 is shorter (shorter than the light guide plate 7), so that when the first reflection plate 2 is heated, the first reflection plate 2 has an extending space to avoid the deformation caused by the confined edge.

The second reflection plate 4 is the secondary reflection plate which is disposed on the side edge close to the light source 3 of the first reflection plate. The first end 401 of the second reflection plate 4 overlaps the first reflection plate 2 and can extend freely. The second end 402 of the second reflection plate 4 extends toward the side edge of the back plate 1 (or, the configuration can be modified to allow the second end 402 to be away from the side edge of the back plate 1 at a certain distance to leave an extending space for the second end 402, so that the second end 402 can extend freely, or to leave an extending space for the first end 401 and the second end 402 respectively, so that both the first end 401 and the second end 402 can extend freely). In this way, the deformation of second reflection plate 4 caused by the confined edge can be avoided. The shorter part of the first reflection plate 2 is supplemented by the second reflection plate 4, and the first reflection plate 2 and the second reflection plate 4 cooperate with each other to make the reflection plate distribute on the whole bottom of the back plate, so that the light emitted to the back plate can be reflected to enter the light guide plate to form the backlight.

It can be understood that if the light sources are disposed on the two sides of the long edge of the back plate 1 respectively, the two ends close to the long edge of the back plate 1 of the first reflection plate 2 are designed to be shorter, so that gaps exist between the two ends of the first reflection plate 2 and the side edges of the back plate 1 respectively; then second reflection plates 4 are disposed in the gaps respectively, and the first ends 401 close to the center of the second reflection plate 2 overlaps the first reflection plate 2 respectively, and the second ends 402 close to the frame extend toward the side edges of the back plate 1 respectively. Only one long side edge is shown in FIG. 2. The reflection plate is provided with four edges; in a similar way, if the light sources are disposed on the two long side edges and the two short side edges of the back plate 1 respectively, the four side edges of the first reflection plate 2 are designed to be shorter, and second reflection plates 4 are disposed to overlap the four side edges. Because of the extending of the second reflection plate 4, the reflection plate still distributes on the whole bottom of the back plate. The configuration avoids the nonuniformity of the reflection light caused by heat and improves the display effect.

For example, in the embodiment mentioned above, the side edge close to the light source 3 of the first reflection plate 2 can correspond to the frame shielding area in the back module (the A-A' area shown in FIG. 2). The edge of the first reflection plate 2 overlaps the second reflection plate 4. The shielding of the frame can avoid affecting the display effect.

Figure 3:
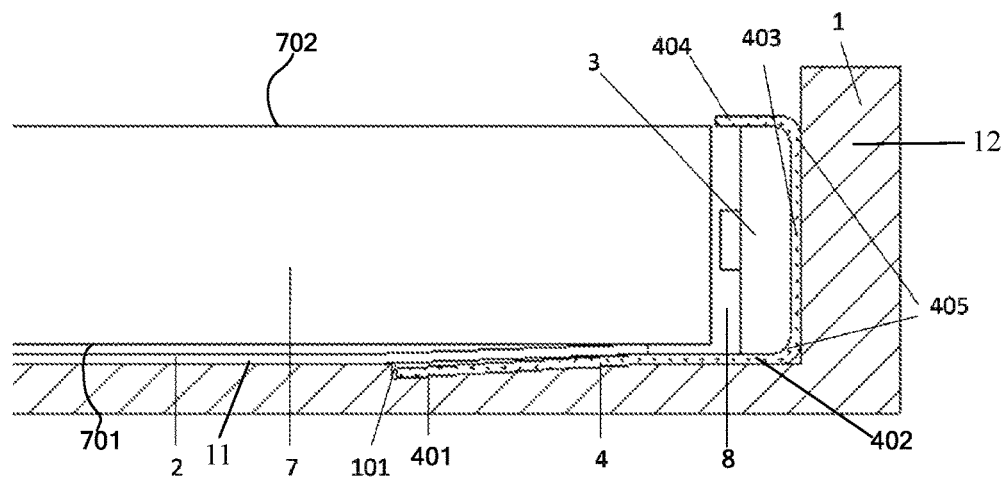
FIG. 3 is a second cross section structure schematic view of a backlight module according to an embodiment of the present disclosure.

Another embodiment of the present disclosure is shown in FIG. 3. As shown in FIG. 3, the light guide plate 7 is disposed above the reflection structure. In this case, the first reflection plate 2 is disposed directly under the light guide plate 7; the first end 401 of the second reflection plate 4 overlaps the first reflection plate 2, and the second end 402 of the second reflection plate 4 extends from the bottom surface 701 of the light guide plate to the light-exit surface 702 of the light guide plate to form a half-surrounded structure wrapping the light source 3.

For example, the half-surrounded structure comprises an upward extending part 403 extending along the gap between the light source 3 and the side edge of the back plate 1 and an extending part 404 extending along the light-exit surface 702.

In order to mix light, a gap 8 usually exists between the light source 3 and the side wall of the light guide plate 7, and part of light emitted from the light source 3 can escape through the gap 8. Therefore, in at least one example of the present embodiment, the end of the half-surrounded structure mentioned above extends along the direction parallel to the light guide plate 7, and covers the light source and the gap 8 between the light source and the light guide plate from the side of light-exit surface 702, so that the light escaping to the directions of the light-exit surface 702 and the side edge of the back plate is reflected back to the light guide plate 7 to increase the light use efficiency.

For example, the half-surrounded structure mentioned above can further comprises a bent part in a rounded shape 405 configured to connect the upward extending part 403 with the extending part 404 extending along the light-exit surface 702. When the second reflection plate 4 is heated and extends, the bent part in the rounded shape 405 can accommodate the deformation caused by heat to avoid the non-uniformity of the reflection light caused by the deformation of the second reflection plate 4 caused by heat.

Figure 4:
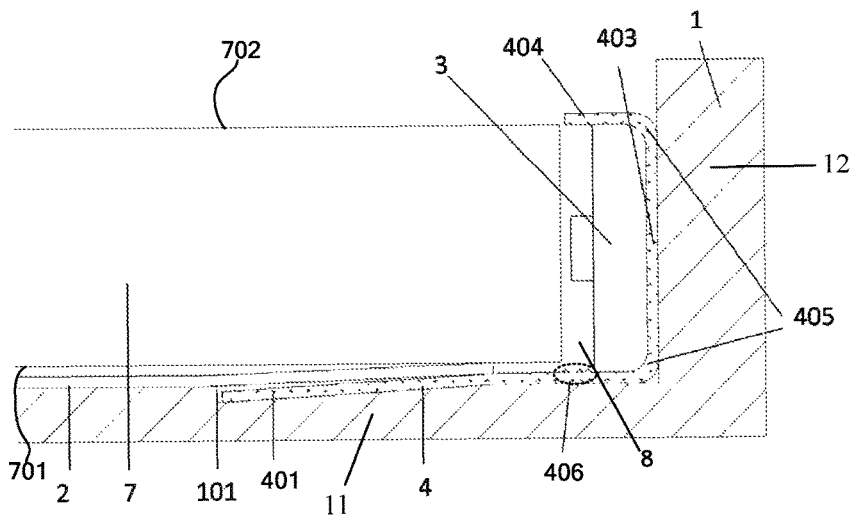
FIG. 4 is a third cross section structure schematic view of a backlight module according to an embodiment of the present disclosure.

Another embodiment of the present disclosure is shown in FIG. 4. The difference between this embodiment and the previous embodiment lies in, preferably, that the second reflection plate 4 is provided with a retractable extendable structure 406 on the end close to the light source 3 in the present embodiment. When the second reflection plate 4 expands by heat or contracts by cool, the retractable extendable structure 406 can absorb the deformation caused by the expansion or contract to avoid affecting the reflection light.

There are many specific ways to realize the retractable extendable structure 406. For example, the retractable extendable structure 406 can be in a hollow structure or a wrinkle structure. The wrinkle structure is shown in FIG. 4. Before it is heated, the wrinkle structure is in a micro contraction mode, i.e. bulging; and after it is heated, the plicate structure can expand to both the inward direction and the outward direction and plays the role of absorbing the deformation to prevent the bulging of the reflection plate from diffusing to the reflection area.

In addition, for example, the location of the retractable extendable structure 406 corresponds to the gap 8 existing between the light source 3 and the side wall of the light guide plate 7. This location configuration can make the retractable extendable structure 406 deform freely, do not affect the other components such as the light guide plate 7, and can avoid affecting the display effect with the help of the shielding by the frame.

A backlight module according to at least one embodiment of the present disclosure is provided with the reflection structure according to any one of the embodiments mentioned above. Meanwhile, the back plate 1 and other components are improved correspondingly to adapt a new reflection structure.

For example, a concave structure 101 is disposed in the back plate 1, and is configured to contain the first end 401 of the second reflection plate 4 and provide an extending space for the first end 401. For example, the first end 401 of the second reflection plate 4 extends from the side wall of the back plate 1 to the concave structure 101 of the back plate 1, and does not extend to the innermost side of the concave structure 101 completely, i.e. a space is reserved between the first end 401 of the second reflection plate 4 and the inner wall to accommodate its expansion when the second reflection plate 4 is heated and extends inward.

In addition, for example, the second reflection plate 4 forms a half-surrounded structure wrapping the light source 3. And in order to make the half-surrounded structure form a bent part in a rounded shape 405, the two corners adjacent to the half-surrounded structure of the light source 3 are each in a rounded shape.

In addition, for example, a positioning column configured for installing the second reflection plate 4 is disposed on the back plate 1.

Figure 5:
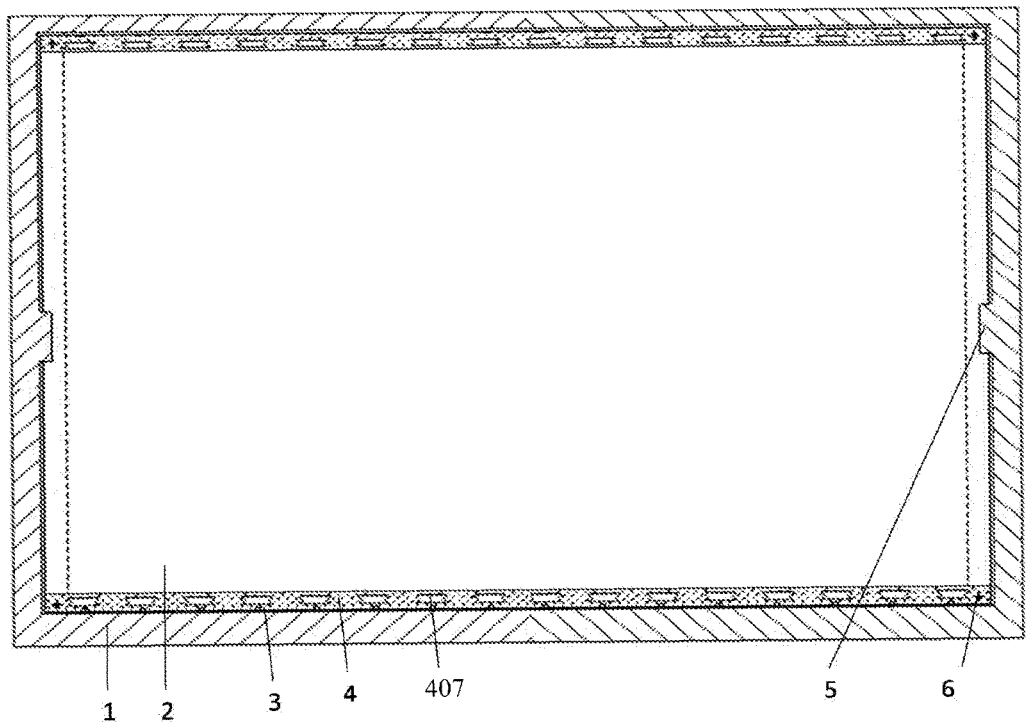
FIG. 5 is an installation schematic view of a reflection structure according to an embodiment of the present disclosure.

For example, as shown in FIG. 5, the first reflection plate 2 is disposed under the light guide plate 7; the second reflection plate 4 is disposed between the back plate 1 and the first reflection plate 2; at the two sides of the short edge of the back plate 1 the second reflection plate 4 and the first reflection plate 2 engaged with the lug 5 of the back plate 1; the second reflection plate 4 is further fixed through the positioning columns 6 distributed at the four corners of the back plate 1; the second reflection plate 4 is provided with a hollow pattern structure 407 (an example of the retractable extendable structure) at the part close to the light source, and can accommodate the deformation caused by heat.

The reflection structure and the backlight module according to the embodiments of the present disclosure apply a new reflection structure, which comprises a first reflection plate mainly used for reflecting light to the light guide plate, and a second reflection plate disposed around the back plate (for example, all around the back plate), and the end close to the light source of the second reflection plate overlaps the first reflection plate. The end close to the light source of the first reflection plate can extend freely, and the ends close to the light source and/or away from the light source of the second reflection plate can extend freely (for example, the end close to the light source of the first reflection plate and the end close to the light source of the second reflection plate can extend freely). Or the second reflection plate is further provided with a structure for absorbing the deformation. Therefore, the reflection structure and the backlight module according to embodiments of the present disclosure not only can reflect the light emitted from the light source to the light guide plate as far as possible to increase the light use efficiency, but also can solve the problem of the deformation of the end close to the light source of the reflection plate of the back light module caused by heat, and further improve the display effect.

The reflection structure according to the embodiments of the present disclosure is especially suitable for large dimension back light systems with multiple light sources structure, and can reduce the deformation of the part close to the light source of the reflection plate caused by heat and increase the light use efficiency.

A display device according to at least one embodiment of the present disclosure comprises any one of the backlight modules mentioned above. The backlight module solves the problem of the deformation of the end close to the light source of the reflection plate of backlight, so that the display effect becomes better and the light use efficiency become high. Thus, a display device according to an embodiment of the present disclosure can obtain a better display quality.

The display device can be any product or component having a display function such as liquid crystal pane, electronic paper, mobile phone, tablet computer, television, display screen, laptop computer, digital photo frame, navigator or the like.

Each of the embodiments is progressively described. The same or similar part of each of the embodiments can be referred to each other, and the part of each of the embodiments different from other embodiments is mainly described in the embodiment.

A reflection structure, a backlight module and a display device according to an embodiment of the present disclosure employing the reflection structure constituted by two kinds of reflection plates: the first reflection plate is disposed directly under the light guide plate; at least one second reflection plate is disposed on an edge of the first reflection plate; one end of the second reflection plate overlaps the first reflection plate, and the other end extends toward the side edge of the back plate; the first reflection plate and the second reflection plate cooperate with each other to make the reflection plate distribute on the whole bottom of the back plate, so that the light emitted to the back plate can be reflected to enter the light guide plate to form the backlight. Meanwhile, the end close to the light source of the first reflection plate can extend freely, and can avoid the deformation of the end close to the light source of the first reflection plate caused by heat; the first end and/or the second end of the second reflection plate can extend freely. Therefore, the end close to the light source of the second reflection plate can extend freely when it is heated and then deform, which can avoid the deformation of the end close to the light source of the second reflection plate. To sum up, the reflection structure, the backlight module and the display device according to embodiments of the present disclosure can solve the problem of the deformation of the end close to the light source of the reflection plate of the backlight module, and further improve the display effect.

What are described above is related to the illustrative embodiments of the disclosure only and not limitative to the scope of the disclosure; the scopes of the disclosure are defined by the accompanying claims.

The present application claims the priority of the Chinese Patent Application No. 201520005453.3 filed on Jan. 4, 2015, which is incorporated herein in its entirety by reference as part of the disclosure of the present application.

The invention claimed is:

1. A reflection structure for a backlight module, wherein the backlight module comprises a light source, a back plate, and a light guide plate which is disposed on the reflection structure, the light source is disposed on a side edge of the back plate, there is a gap between the light source and a side wall of the light guide plate, wherein the reflection structure comprises:
   a first reflection plate disposed on the back plate, an end close to the light source of which can extend freely; and
   at least one second reflection plate disposed on an edge of the first reflection plate, wherein a first end of the second reflection plate overlaps the first reflection plate, a second end of the second reflection plate extends toward the side edge of the back plate, at least one of the first end and the second end of the second reflection plate can extend freely, and the second reflection plate is provided with a retractable extendable structure on the end close to the light source,
   wherein the retractable extendable structure and the end of the first reflection plate close to the light source are spaced from each other, and the retractable extendable structure is positioned corresponding to the gap only.

2. The reflection structure according to claim 1, wherein the retractable extendable structure is a hollow structure or a wrinkle structure.

3. The reflection structure according to claim 1, wherein the second end of the second reflection plate extends from a bottom surface of the light guide plate to a light-exit surface of the light guide plate to form a half-surrounded structure wrapping the light source.

4. The reflection structure according to claim 3, wherein an end of the half-surrounded structure extends along a direction that is parallel to the light guide plate and covers the gap from a side of the light-exit surface.

5. The reflection structure according to claim 3, wherein the half-surrounded structure comprises a bent part in a rounded shape.

6. The reflection structure according to claim 1, wherein an edge of the first reflection plate close to the light source corresponds to a frame shielding area which is disposed in the backlight module.

7. A backlight module, comprising the reflection structure according to claim 1.

8. The backlight module according to claim 7, wherein a concave structure is disposed in the back plate, and is configured to contain the first end of the second reflection plate and provide an extending space for the first end.

9. The backlight module according to claim 8, wherein a half-surrounded structure wrapping the light source is formed by the second reflection plate, and two corners of the half-surrounded structure adjacent to the light source are rounded angles.

10. The backlight module according to claim 7, wherein a half-surrounded structure wrapping the light source is formed by the second reflection plate, and two corners of the half-surrounded structure adjacent to the light source are rounded angles.

11. The backlight module according to claim 7, wherein a positioning column configured for installing the second reflection plate is disposed on the back plate.

12. A display device comprising the backlight module according to claim 7.

13. The backlight module according to claim 8, wherein a positioning column configured for installing the second reflection plate is disposed on the back plate.

* * * * *